April 15, 1941.   B. D. BRASWELL   2,238,306
CURB FEELER FOR AUTOMOBILES
Filed Oct. 7, 1939
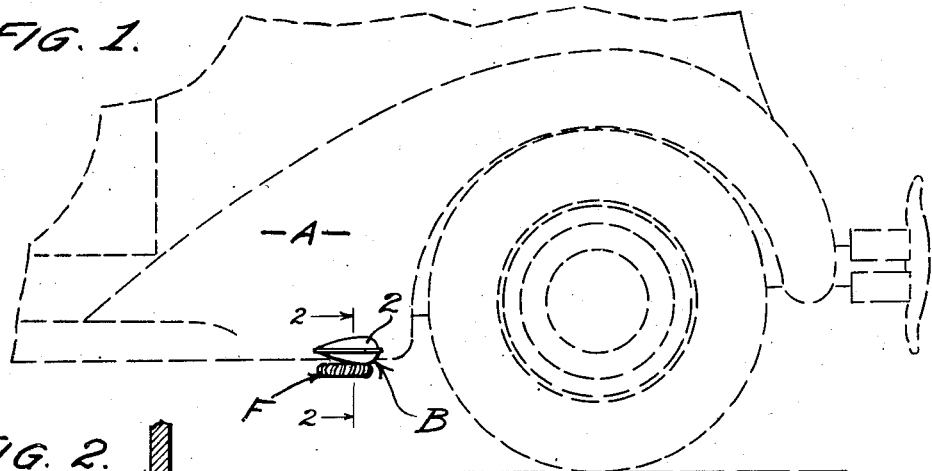
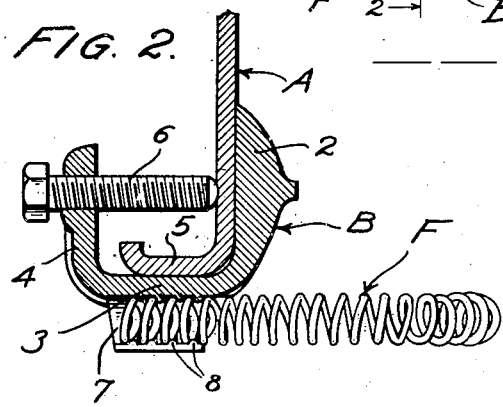
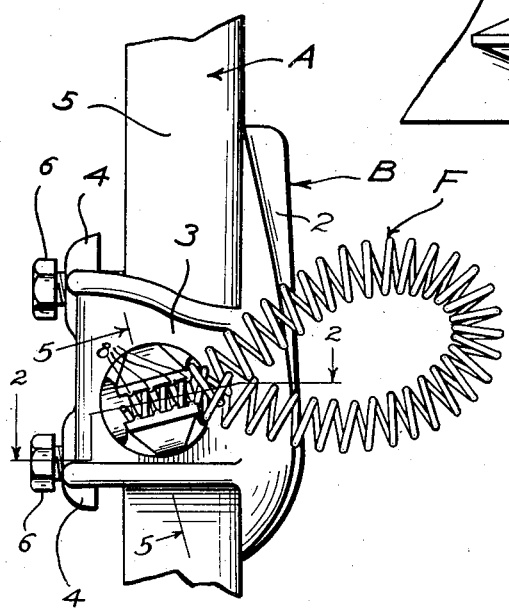
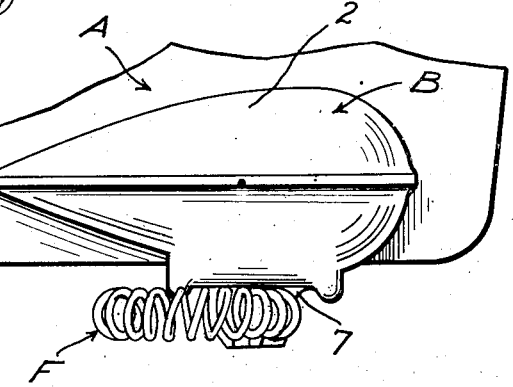
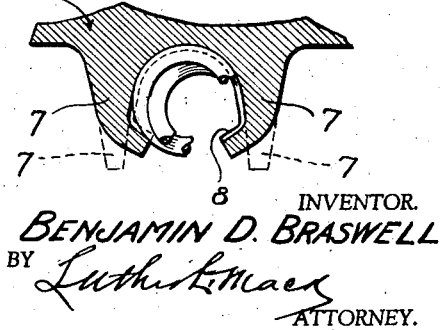
INVENTOR.
BENJAMIN D. BRASWELL
BY Luther L. Mack
ATTORNEY.

Patented Apr. 15, 1941

2,238,306

UNITED STATES PATENT OFFICE 2,238,306

CURB FEELER FOR AUTOMOBILES

Benjamin D. Braswell, Los Angeles, Calif.

Application October 7, 1939, Serial No. 298,444

5 Claims. (Cl. 116—28)

This invention relates to curb feelers for vehicles and has for a primary object the provision of an improved form of device which is applicable preferably to a fender of an automotive vehicle, but also in some cases to a bumper or other more or less resonant part of a vehicle, whereby upon a too close approach to a curb or other obstacle the engagement of an extended portion of the feeler will set up vibrations in the supporting fender or other resonant member, thereby indicating to the vehicle operator the position of the vehicle relative to said curb or obstacle.

In the consideration of my present invention, attention is called to my pending application for patent for a device for a similar purpose, filed November 4, 1937, Serial No. 172,841 and also to United States Letters Patent No. 2,141,844 granted on December 27, 1938, to one Reznor for a device for a similar purpose and with which I am familiar.

It is an object of this invention to provide certain improvements over the device disclosed in my said pending application for patent as well as over the device disclosed in said patent, particularly in the following respects. First to provide a more simple and economical form of device; second to provide a quickly attachable and detachable form of device of rigid and substantial construction adapted to withstand continued usage without injury to the device or to the vehicle to which it is attached; third, to eliminate any necessity for the provision of any means whatever connected with or forming a part of the device for visually or audibly signalling the operator of a vehicle, but in sole reliance on the vibration and resonance of the vehicle fender for amplifying the sound caused by the engagement of the feeler with a curb or other obstacle; and finally, to provide the feeler proper of such form and so mounted that it will readily yield in any direction when it engages a curb or obstacle. Other objects may appear as the description of my device progresses.

I have shown a preferred form of device embodying my improvements in the accompanying drawing, subject to modification within the scope of the appended claims without departing from the spirit of my invention.

In said drawing:

Fig. 1 is a fragmentary side elevation of a motor vehicle with my curb feeler attached thereto for use;

Fig. 2 is an enlarged section of the same on line 2—2 of Fig. 1;

Fig. 3 is an enlarged side elevation of the device detached from the vehicle;

Fig. 4 is a bottom plan of the device; and

Fig. 5 is a section of the same on line 5—5 of Fig. 4.

I prefer to construct the device of this invention with but two parts, comprising a bracket B and a resilient feeler F, said bracket being preferably attached to the lower edge of a fender A of a vehicle and said feeler being attached to the bottom of bracket B and extended from said bracket horizontally for a short distance outwardly beyond the outermost portion of the vehicle for engagement with a curb or other obstacle.

Bracket B is of generally U shaped cross section, as shown in Fig. 2 with an ornamental and more or less streamlined outer side portion 2, a bottom portion 3 and an inner side portion 4. Fenders of motor vehicles are usually provided with beads or inwardly turned reinforcing portions as at 5, and the bracket B is designed so as to embrace the lower beaded portion of the fender A, as shown in Fig. 2 with the side 2 of the bracket engaging the side of the fender and the bottom 3 engaging the inwardly turned portion 5. One or more screws 6 are threaded through the inner side 4 of the bracket B so that when said screws are tightened the ends thereof will tightly engage the inner side of the fender and thus serve to hold the device detachably in place on the fender A.

The feeler F is formed of a single piece of spring steel wire coiled to form a moderately stiff but sufficiently yieldable member for direct engagement with a curb or the like, and the two ends of the spring feeler are interlocked at adjacent convolutions, as shown in Fig. 5, and are adapted to be secured to the bottom 3 of the bracket B by suitable attaching means. In the form of device shown herein the bracket B has a depending lug, or lugs 7 in or between which the ends of the feeler F are locked or frictionally held against displacement during use, or to which the feeler may be otherwise suitably attached in a convenient manner, the particular form of attaching means being immaterial to this invention.

The bracket B may be of cast or forged material so that when the ends of the spring feeler F are positioned in a slot in or between the lugs 7 said lugs may be struck with a hammer or the like, or in a press, bent over the ends of the spring feeler for holding the feeler in position on the bracket. The lugs at their adjacent faces may be provided with ribs or the like, as at 8, which may engage between the convolutions of the spring and thus serve to lock the spring ends in position.

In any case, the feeler spring forms a horizontally extending loop which, obviously, may yield upwardly, downwardly or laterally when it strikes an obstruction such as a curb or the like, and the scraping of the spring feeler on such curb or the like will set up vibrations in the spring which will be communicated through bracket B to the resonant body of fender A, thereby substantially amplifying the sound and calling the attention of the vehicle operator to the fact that the vehicle is in close approach to the curb or other obstruction.

It is necessary to provide but a single feeler to a vehicle and that feeler will be located on the front right hand fender, although a device may be provided on the other side or at the four corners of the vehicle if desired.

It should be noted that the outer side portion 2 of the bracket B will serve as a guard to protect the fender in the event of failure of the feeler F or the bending of the same inward to an extent as would permit the bracket to contact the curb. The scraping sound made by the outer side 2 against the curb would indicate to the driver the too close proximity of the fender to the curb as well as protect the fender.

It should be noted that the bracket 2 affords quick attachment of the device to the vehicle without requiring the formation of holes or changing the construction of parts of the automobile.

What I claim is:

1. A device of the character described comprising: a bracket attachable to a resonant portion of the body of a vehicle, and a feeler formed of a helically coiled spring secured at its ends to said bracket, the portion intermediate said ends forming a loop disposed substantially in a horizontal plane and extended outwardly from said vehicle for engagement with a curb or the like, for the purpose described.

2. A device of the character described comprising a bracket adapted to be attached to a vehicle and a feeler formed of a helically coiled spring having its ends secured to said bracket and a portion between its ends extended for contact with a curb or obstruction adjacent to which the vehicle may be disposed.

3. A curb feeler comprising a resilient and vibratory member and means for securing the ends of said member at a common point on a vehicle and in such manner that the member is held under tension as a loop with the bight portion thereof extended outwardly and adapted to contact a curb or obstruction before the vehicle.

4. A curb feeler comprising a resilient and vibratory member and means for securing the ends of said member on a vehicle in such a manner that the member is held under tension as a loop with a portion between the ends thereof extending outwardly and adapted to contact a curb or obstruction in advance of portions of the vehicle.

5. A curb feeler comprising a resilient and vibratory member and means for securing the ends of said member on a vehicle in such a manner that the member is held under tension as a loop with a portion between the ends thereof extending outwardly and adapted to contact a curb or obstruction in advance of portions of the vehicle, said means including a bracket having a portion projecting outwardly from the vehicle to serve as an auxiliary feeler adapted to contact said curb or obstruction.

BENJAMIN D. BRASWELL.